United States Patent
Grancharov et al.

(10) Patent No.: US 10,418,037 B2
(45) Date of Patent: Sep. 17, 2019

(54) SPEAKER VERIFICATION COMPUTER SYSTEM WITH TEXTUAL TRANSCRIPT ADAPTATIONS OF UNIVERSAL BACKGROUND MODEL AND ENROLLED SPEAKER MODEL

(71) Applicant: Telefonaktiebolaget LM Ericsson (publ), Stockholm (SE)

(72) Inventors: Volodya Grancharov, Solna (SE); Erlendur Karlsson, Uppsala (SE); Harald Pobloth, Täby (SE); Sigurdur Sverrisson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/084,328

(22) PCT Filed: Mar. 23, 2016

(86) PCT No.: PCT/EP2016/056373
§ 371 (c)(1),
(2) Date: Sep. 12, 2018

(87) PCT Pub. No.: WO2017/162281
PCT Pub. Date: Sep. 28, 2017

(65) Prior Publication Data
US 2019/0080697 A1 Mar. 14, 2019

(51) Int. Cl.
*G10L 15/00* (2013.01)
*G10L 17/02* (2013.01)
(Continued)

(52) U.S. Cl.
CPC .............. *G10L 17/02* (2013.01); *G10L 15/26* (2013.01); *G10L 17/04* (2013.01); *G10L 17/06* (2013.01); *G10L 17/20* (2013.01)

(58) Field of Classification Search
CPC ......... G10L 17/02; G10L 15/26; G10L 17/04; G10L 17/20; G10L 17/06
(Continued)

(56) References Cited

FOREIGN PATENT DOCUMENTS

WO    WO 2014/040124 A1    3/2014

OTHER PUBLICATIONS

International Search Report and Written Opinion of the International Searching Authority for International Application No. PCT/EP2016/056373 dated Jun. 8, 2016.
(Continued)

*Primary Examiner* — Thierry L Pham
(74) *Attorney, Agent, or Firm* — Sage Patent Group (57) ABSTRACT

A sampled speech data sequence contains words spoken by a speaker. A sequence of feature vectors is generated characterizing spectral distribution of sampled speech data. A textual transcript of the words spoken by the speaker is obtained. Data structures of a universal background model of a Gaussian mixture model (UBM-GMM) and of an Enrolled speaker Gaussian mixture model (ENR-GMM) are adapted responsive to the textual transcript, to generate an adapted UBM-GMM and an adapted ENR-GMM, respectively. An enrolled speaker probability is generated based on the sequence of feature vectors and the adapted ENR-GMM, and a universal speaker probability is generated based on the sequence of feature vectors and the adapted UBM-GMM. A speaker verification indication of whether the speaker is an enrolled speaker is generated by comparing the enrolled speaker probability to the universal speaker probability.

20 Claims, 8 Drawing Sheets

(51) Int. Cl.
*G10L 15/26* (2006.01)
*G10L 17/04* (2013.01)
*G10L 17/20* (2013.01)
*G10L 17/06* (2013.01)
*G10L 17/00* (2013.01)

(58) Field of Classification Search
USPC .......................................................... 704/246
See application file for complete search history.

(56) References Cited

OTHER PUBLICATIONS

Reynolds et al., "Speaker Verification Using Adapted Gaussian Mixture Models," Digital Signal Processing, Academic Press, Orlando FL, USA, vol. 10, Nos. 1-3 dated Jun. 3, 1999, pp. 19-41.

Gutman et al., "Speaker Verification Using Phoneme-Adapted Gaussian Mixture Models," 2006 14$^{th}$ European Signal Processing Conference, IEEE, dated Sep. 3, 2002, pp. 1-4.

TingYao Wu et al., "UBM-based Incremental Speaker Adaptation," Proceedings of the 2003 International Conference on Multimedia and Expo dated Jul. 6-9, 2003, Baltimore MA, USA, pp. 721-724.

SPEAKER VERIFICATION COMPUTER SYSTEM WITH TEXTUAL TRANSCRIPT ADAPTATIONS OF UNIVERSAL BACKGROUND MODEL AND ENROLLED SPEAKER MODEL

CROSS REFERENCE TO RELATED APPLICATIONS

This application is a 35 U.S.C. § 371 national stage application of PCT International Application No. PCT/EP2016/056373, filed on Mar. 23, 2016, the disclosure and content of which is incorporated by reference herein in its entirety.

TECHNICAL FIELD

The present invention relates to speech processing and, more particularly, to automatic verification of speakers.

BACKGROUND

The goal of a speaker verification system is to determine if a test utterance is spoken by a speaker having an unknown or alleged identity (i.e., determining whether an unknown voice is from a particular enrolled speaker). The problem is typically formalized by defining a 2-class Hypothesis test:

$H_0$: tested speaker is the target speaker, $H_1$: tested speaker is not the target speaker. (1)

Let $x^{enr}$ denote the total feature space of the enrolled (enr) speaker (large number of D dimensional feature vectors) available for offline training. Then one approach is to represent $H_0$ by a model denoted $\lambda^{enr}$ that characterizes the hypothesized speaker (statistics of the feature space $x^{enr}$). The alternative hypothesis, $H_1$, is represented by the model $\lambda^{ubm}$ that captures the statistics of the space of imposter speakers.

Let $x=[x_1, x_2, \ldots, x_N]$ be a sequence of N, D dimensional feature vectors, extracted from the test utterance. To perform verification, $H_0$ and $H_1$ are tested with the feature sequence x, extracted from the test utterance (test data is matched with the model to calculate a verification score). This is done by calculating the log-likelihoods of x, given the models $\lambda$ to construct $$\Lambda(x)=\log(p(x|\lambda^{enr}))-\log(p(x|\lambda^{ubm})) \qquad (2)$$

where $\lambda^{enr}$ is a model characterizing the hypothesized enrolled speaker and $\lambda^{ubm}$ is a Universal Background Model (UBM) characterizing all enrolled speakers. The log-likelihood distance $\Lambda$ measures how much better the enrolled speaker model scores for the test utterance compared to the UBM. The Hypothesis test can be resolved based on the following relationship:

if $\Lambda(x)>\theta$ accept $H_0$, if $\Lambda(x)\leq\theta$ accept $H_1$ (3)

where $\theta$ is an offline optimized threshold level.

Gaussian mixture models (GMMs) are the dominant approach for modeling distributions of feature space in text-independent speaker verification applications. So that $\lambda$ denotes weights, mean vector and covariance matrix parameters of the GMM with K components $\lambda$: $\{u_k, \mu_k, \Sigma_k\}_{k=1}^{K}$ In other words, probability distributions are modeled as superposition of K components (Gaussian densities) $\Phi_k$, with weights $u_k$, based on the following equation:

$$\log(p(x|\lambda)) = \sum_{n=1}^{N} \log\left(\sum_{k=1}^{K} u_k \Phi_k(x_n)\right) \qquad (4)$$

where summation over n accumulates contributions from individual features vectors $x_n$ in the test sequence s. The components $\Phi_k$ are determined by set of means $\mu_k$ and covariances $\Sigma_k$ based on the following equation:

$$\Phi_k(x_n) = \frac{\exp\left\{-\frac{1}{2}(x_n - \mu_k)^T \sum_k^{-1} (x_n - \mu_k)\right\}}{(2\pi)^{\frac{D}{2}} |\Sigma_k|^{\frac{1}{2}}} \qquad (5)$$

In a more general sense, the $\lambda^{enr}$ GMMs for the enrolled speakers can be considered to model the underlying broad phonetic sounds that characterize a person's voice, while the much larger $\lambda^{ubm}$ GMM for the space of imposter speakers captures underlying sound classes in speech. Enrolled speakers $\lambda^{enr}$ are simply trained on the available audio data for each particular speaker. The $\lambda^{ubm}$ is trained by pooling speech from a large number of enrolled speakers to build a single model, UBM, which results in one complex model for the imposter space. The $\lambda^{ubm}$ GMM can have a large number of components, typically K>1024, compared to about 64 components for the enrolled GMM.

One can distinguish two major classes of speaker verification systems: 1) text-dependent system which assumes that a person to be recognized is speaking a previously defined text string; and 2) text-independent speaker verification which does not know what text string is being spoken by a person to be recognized.

Text-dependent systems are more accurate, but their usage is typically limited to security applications because the speaker must vocalize one or more words or phrases from an allowed set. Text-independent speaker verification systems have been used in more types of applications, but are less accurate because they have to model speakers for a large variety of possible phonemes and contexts. This means that a context independent model can have a relatively high probability assigned to a feature subspace that is not present in the test utterance, which can offset the speaker verification of that particular utterance and result in incorrect verification. This problem becomes particularly pronounced in cases where the feature space of the current test utterance is modeled unequally well by the UBM and the speaker model.

SUMMARY

Some embodiments of the present invention are directed to a method by a speaker verification computer system for verifying a speaker, which is performed by at least one processor of the speaker verification computer system. The method includes obtaining a sequence of sampled speech data containing a sequence of words spoken by the speaker. A sequence of feature vectors is generated that characterizes spectral distribution of the sequence of sampled speech data. A textual transcript of the sequence of words spoken by the speaker is obtained. Data structures of a universal background model of a Gaussian mixture model (UBM-GMM) and of an Enrolled speaker Gaussian mixture model (ENR-GMM) are adapted responsive to the textual transcript, to generate an adapted UBM-GMM and an adapted ENR- GMM, respectively. An enrolled speaker probability is generated based on a combination of the sequence of feature vectors and the adapted ENR-GMM, and a universal speaker probability is generated based on a combination of the sequence of feature vectors and the adapted UBM-GMM. A speaker verification indication of whether the speaker is an enrolled speaker is generated based on a comparison of the enrolled speaker probability to the universal speaker probability. The method then selectively communicates an indication of the enrolled speaker based on whether the speaker verification indication satisfies a defined rule.

A potential advantage of this approach is that the speaker verification computer system operates as a text-independent system because the speaker is not restricted to speaking words in a defined library which are acceptable for verification purposes. Adapting the data structures of a UBM-GMM and of the ENR-GMM responsive to the textual transcript, to generate an adapted UBM-GMM and an adapted ENR-GMM, respectively, can achieve improved verification accuracy that approaches that of a text-dependent speaker verification computer system. Improved speaker verification accuracy can thereby be provided without restricting the particular words that can be spoken by the speaker during the verification operations.

Some other embodiments of the present invention are directed to a speaker verification computer system for verifying a speaker. The system includes at least one processor and at least one memory coupled to the at least one processor. The at least one memory embodies computer readable program code that when executed by the at least one processor causes the at least one processor to perform operations. The operations include obtaining a sequence of sampled speech data containing a sequence of words spoken by the speaker. A sequence of feature vectors is generated that characterizes spectral distribution of the sequence of sampled speech data. A textual transcript of the sequence of words spoken by the speaker is obtained. Data structures of a universal background model of a Gaussian mixture model (UBM-GMM) and of an Enrolled speaker Gaussian mixture model (ENR-GMM) are adapted responsive to the textual transcript, to generate an adapted UBM-GMM and an adapted ENR-GMM, respectively. An enrolled speaker probability is generated based on a combination of the sequence of feature vectors and the adapted ENR-GMM, and a universal speaker probability is generated based on a combination of the sequence of feature vectors and the adapted UBM-GMM. A speaker verification indication of whether the speaker is an enrolled speaker is generated based on a comparison of the enrolled speaker probability to the universal speaker probability. The operations then selectively communicate an indication of the enrolled speaker based on whether the speaker verification indication satisfies a defined rule.

Other methods and systems according to embodiments of the invention will be or become apparent to one with skill in the art upon review of the following drawings and detailed description. It is intended that all such additional methods and systems be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
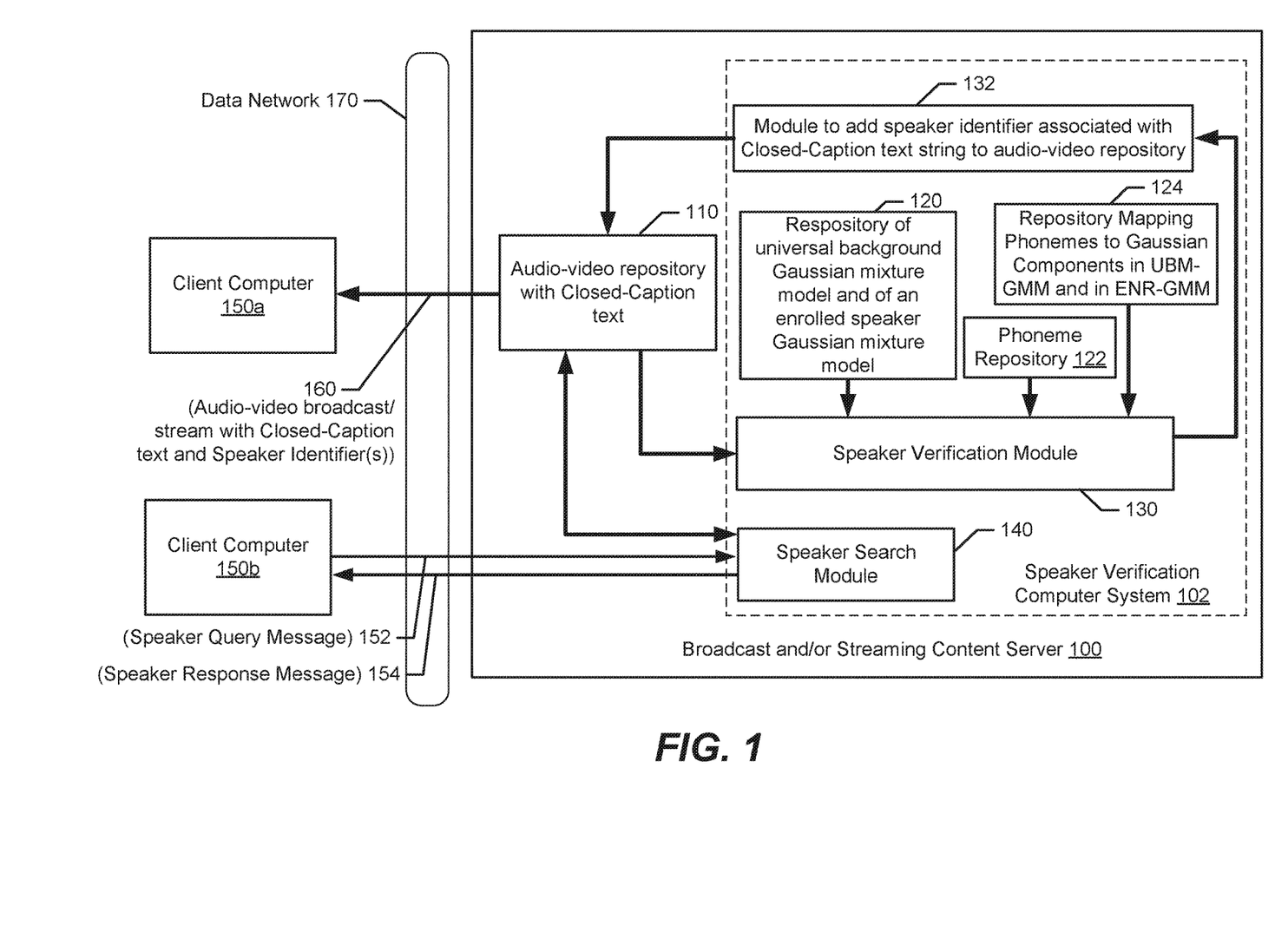
FIG. 1 is a block diagram of a system that includes a broadcast and/or streaming content server having a speaker verification computer system that is configured according to some embodiments of the present disclosure.

Referring to the block diagram of FIG. 1, the broadcast and/or streaming content server 100 includes a speaker verification computer system 102 that is configured according to some embodiments of the present disclosure. The content server 100 can contain or be communicatively connected to an audio-video repository 110 that stores audio and video content and further stores closed-caption text strings. The closed-caption text strings provide a textual transcription of the audio content of a program (e.g., movie, television show, user posted video, etc.) that may be streamed, broadcast, or otherwise provided to client computer devices 150a, 150b, etc.

The speaker verification computer system 102 contains a speaker verification module 130 that is configured to verify if one or more speakers of the audio content is an enrolled speaker using the closed-captioned text strings to improve speaker verification accuracy. The speaker verification computer system 102 can also include a module 132 that adds identifier(s) for the one or more speakers to speaker identification metadata that has logical associations to defined locations in the closed-caption text string corresponding to where the identified speaker is speaking and/or adds identifier(s) for the one or more speakers to speaker identification metadata that has logical associations to defined locations in the audio content corresponding to where the identified speaker is speaking. The audio and video content 160, including the speaker identification metadata and possibly further including the closed-caption text strings, can be broadcast, streamed, and/or otherwise provided to client computer devices 150a, 150b, etc. through a data network 170 such as a public wide area network, e.g., Internet, and/or a private wide area network. The client computers 150a, 150b, etc. may display the identifiers of the recognized speakers as subtitles during playing of the video content through a corresponding display screen of the client computers 150a, 150b, etc. The speaker identifier may be displayed on the display screen synchronized in time with when the speaker's voice is present in the audio content being played through a speaker of the client computers 150a, 150b, etc.

The speaker verification computer system 102 may additionally or alternatively allow client computers to search the speaker identification metadata added to the audio-video repository 110 to identify one or more speakers. In the example of FIG. 1, a client computer 150b communicates a speaker query message 152 through the data network 170 to a speaker search module 140, which may be in the speaker verification computer system 102. The speaker search module 140 searches the speaker identification metadata to identify whether a queried speaker identified by the speaker query message 152 is contained in the audio content of the repository 110. The speaker search module 140 communicates a speaker response message 154 to the client computer 150b. The speaker response message 154 can identify whether the queried speaker is contained in the audio content and may provide information identifying location in the audio content and/or locations in the video content where the queried speaker is speaking. The speaker search module 140 may control streaming of the audio and video content from the repository 110 to the client computer 150b so that only the defined time portion(s) of the audio content that contain voice of the queried speaker is/are provided to the client computer 150b.

Embodiments of the present disclosure can provide accuracy improvements in speaker verification by using a textual transcription of what was spoken. Text metadata contains at least a portion of the textual transcription that has been defined, e.g., typed by a human listener, or determined from computer processing of the speech, e.g., by speech-to-text recognition operations. Some embodiments are explained herein in the context of performing speaker verification using closed-caption text strings or other textual transcript that has been defined for audio and video content provided by a broadcast and/or streaming content server.

Figure 2:
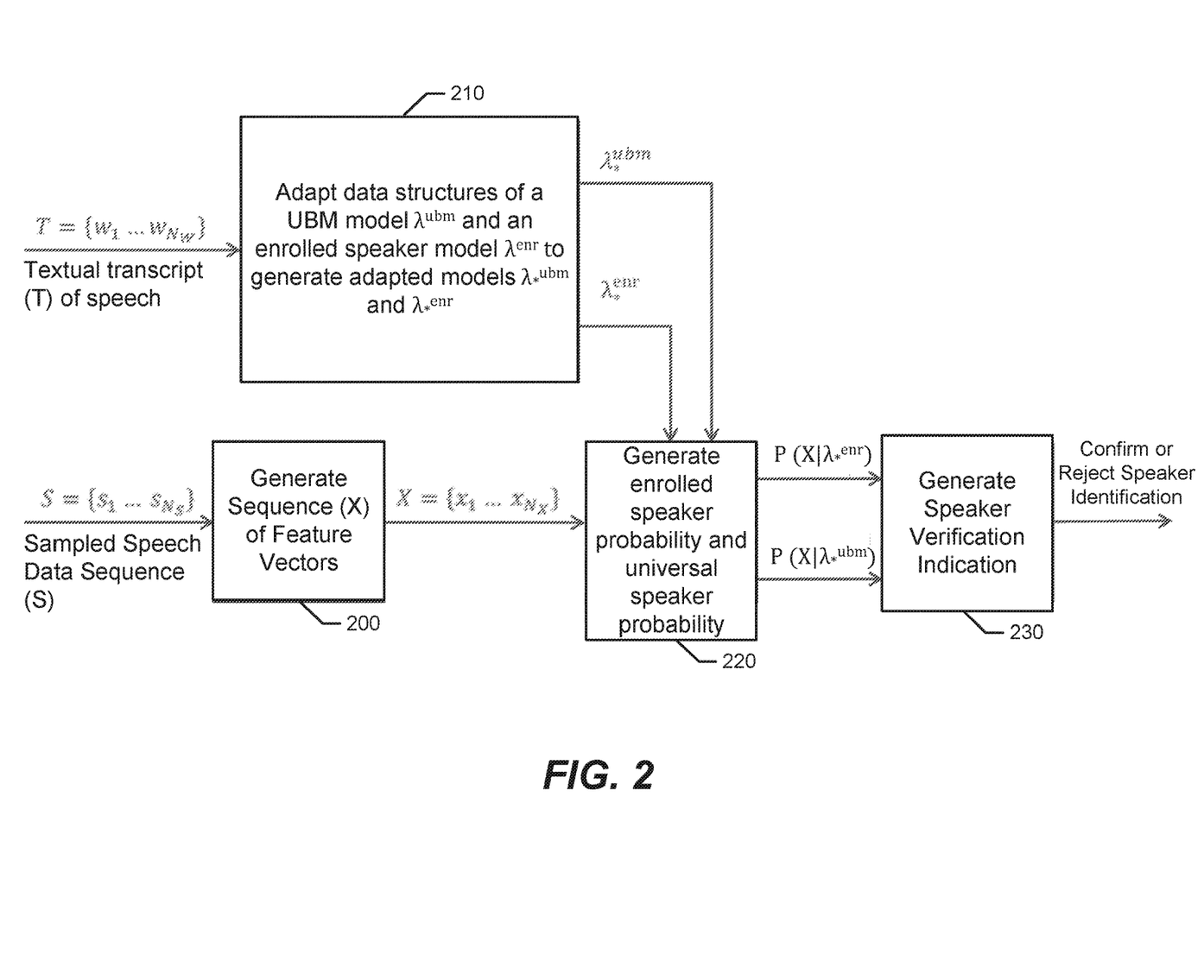
FIG. 2 is a block diagram of components of a speaker verification module of FIG. 1 configured according to some embodiments of the present disclosure to determine whether a speaker is an enrolled speaker using an ENR-GMM and a UBM-GMM which are adapted based on a textual transcript of the tested speech.
Figure 3:
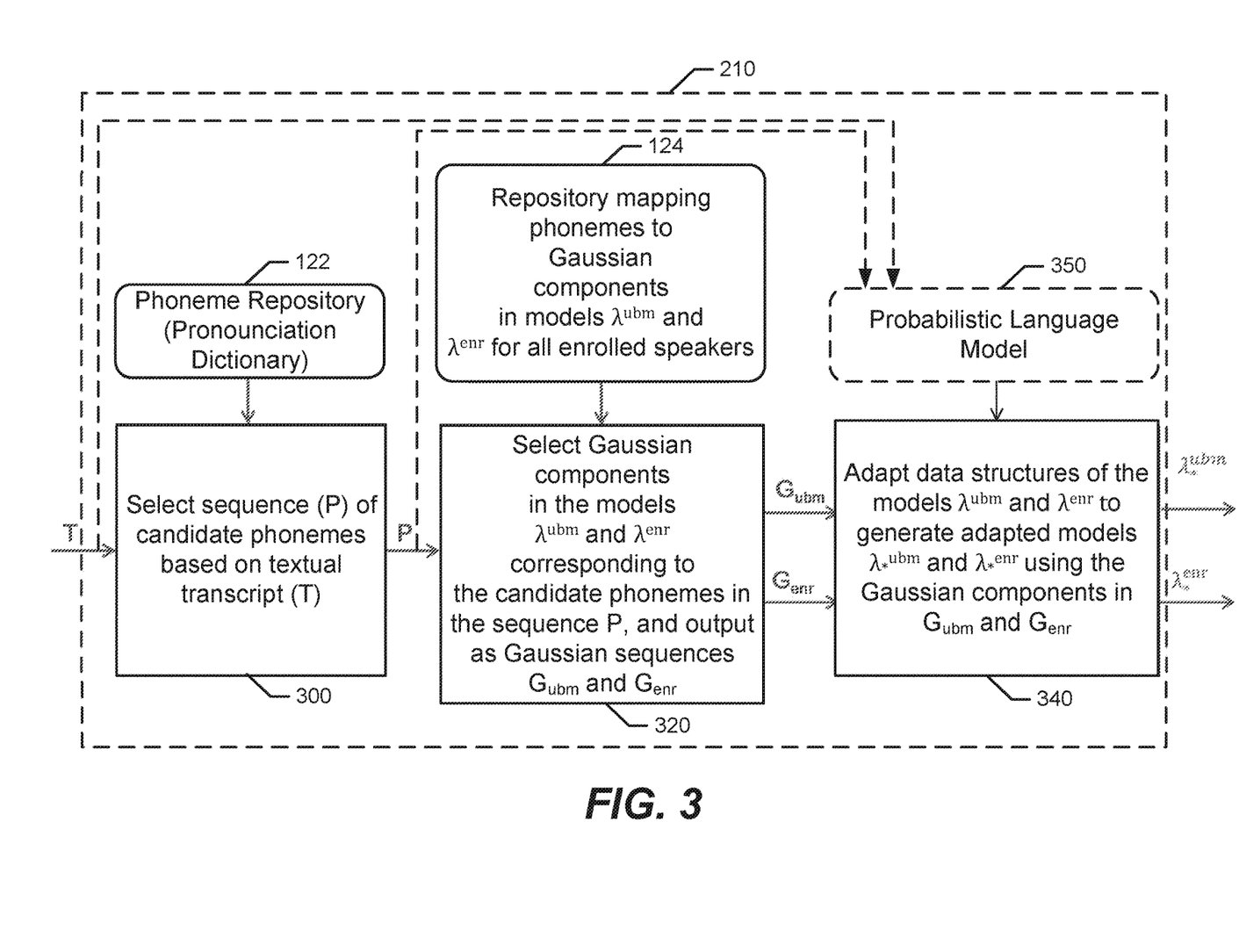
FIG. 3 is a block diagram of further components of the ENR-GMM and UBM-GMM adaptation module of FIG. 2 that generates an adapted ENR-GMM ($\lambda_*^{enr}$) and adapted UBM-GMM ($\lambda_*^{ubm}$) based on the textual transcript of the tested speech according to some embodiments of the present disclosure.

Various operations and methods that can be performed to recognize a speaker are now explained in the context of FIG. 1 and with reference to the block diagrams of FIGS. 2 and 3 and the flowcharts of FIG. 4-8. FIG. 2 is a block diagram of components of the speaker verification module 130 of FIG. 1 configured according to some embodiments of the present disclosure to determine whether a speaker is an enrolled speaker using an Enrolled speaker Gaussian mixture model (ENR-GMM) and using a universal background model of a Gaussian mixture model (UBM-GMM), both of which are adapted based on a textual transcript of the tested speech. FIG. 3 is a block diagram of further components of the ENR-GMM and UBM-GMM adaptation module 210 of FIG. 2 that adapts the ENR-GMM and the UBM-GMM based on the textual transcript of the tested speech according to some embodiments of the present disclosure. FIG. 4-8 are flowcharts of operations and methods by the speaker verification module 130 to generate an indication of whether a speaker of a speech segment is a candidate speaker in accordance with some embodiments of the present disclosure.

The speaker verification computer system 102 contains a repository 120 of data structures of the UBM-GMM and of the ENR-GMM, a repository 122 of phonemes, and a repository 124 containing information that maps phonemes to Gaussian components in the UBM-GMM and the ENR-GMM. The data structures of the UBM-GMM and of the ENR-GMM in the repository 120 are adapted based on the textual transcript of the tested speech. Adapting the data structures of the UBM-GMM and of the ENR-GMM responsive to the textual transcript, to generate an adapted UBM-GMM and an adapted ENR-GMM, respectively, can achieve improved verification accuracy that approaches that of a text-dependent speaker verification computer system. Improved speaker verification accuracy can thereby be provided without restricting the particular words that can be spoken by the speaker during the verification operations.

Figure 4:
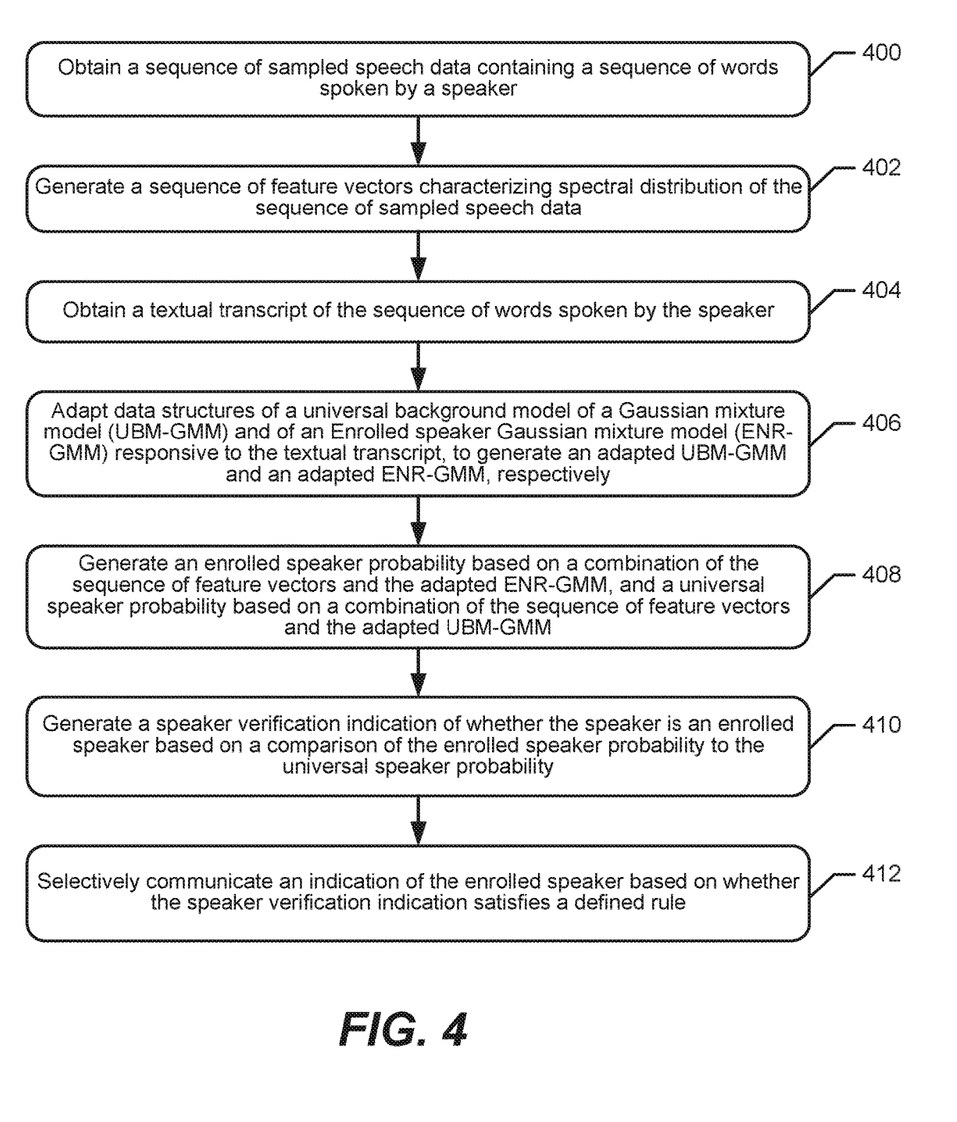
FIGS. 4-8 are flowcharts of operations and methods by the speaker verification computer system of FIG. 1 to generate a speaker verification indication of whether a speaker of a speech segment is a candidate speaker in accordance with some embodiments of the present disclosure.
Figure 6:
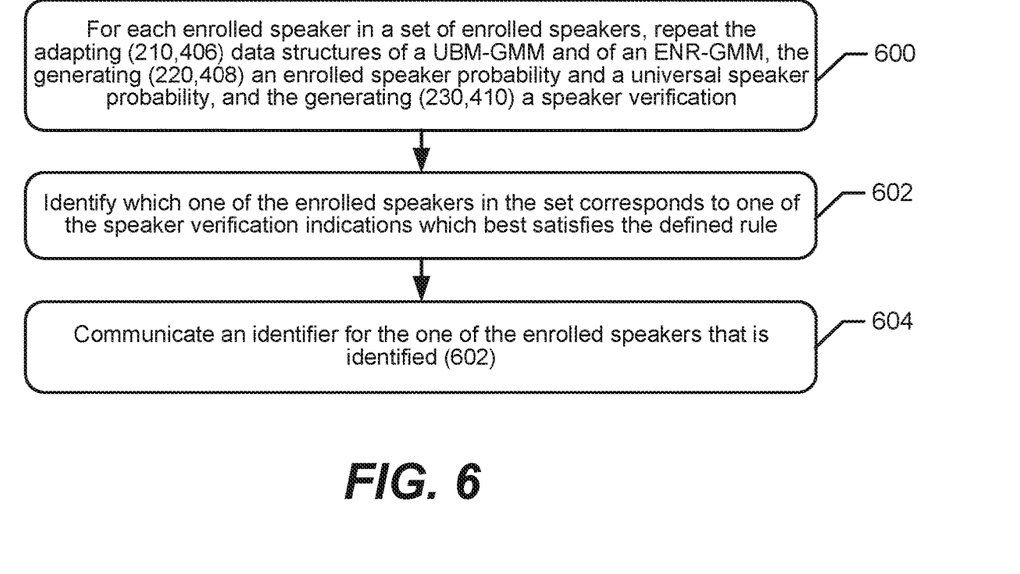

Referring to FIGS. 2, 4 and 6, digitized speech is provided by a speech source, which may include an audio digitizer connected to receive an analog signal from a microphone or may include digitized speech data that has been previously recorded in a memory. A sequence of sampled speech data (S) containing a sequence of words spoken by the speaker is obtained (block 400 of FIG. 4), such as directly from the audio digitizer. The sequence of sampled speech data may contain at least 3 seconds of speech so that at least a few words spoken by the speaker are captured and a corresponding transcript of those words is provided to the speaker verification module 130. More than 7 seconds of speech may not provide a sufficient improvement in the speaker verification operations to justify the additional computer processing and memory requirements that such additional sequence of sampled speech data would necessitate. The speaker verification module 130 generates (block 200 of FIG. 2, block 402 of FIG. 4) a sequence of feature vectors characterizing spectral distribution of the sequence of sampled speech data. The features vectors can correspond to $x=[x_1, x_2, \ldots, x_N]$, which is a sequence of N, by D dimensional feature vectors characterizing spectral distribution of the speech segment data.

The speaker verification module 130 uses an audio transcript corresponding to the speech segment data to improve accuracy of the speaker verification. The speaker verification module 130 obtains (block 404) a textual transcript (T) of a sequence of words ($W_1 \ldots W_{NW}$) spoken by the speaker. The textual transcript may be obtained by parsing closed-caption text strings, contained in the audio-video repository 110, that are time aligned with timing indicators spaced apart along the digital audio recording to generate audio transcript segments.

The speaker verification module 130 adapts (block 210 of FIG. 2, block 406 of FIG. 4) data structures of a universal background model of the Gaussian mixture model (UBM-GMM) ($\lambda^{enr}$) and of the Enrolled speaker Gaussian mixture model (ENR-GMM) ($\lambda^{enr}$) e.g., in the repository 120 of FIG. 1, responsive to the textual transcript, to generate an adapted UBM-GMM ($\lambda_*^{ubm}$) and an adapted ENR-GMM ($\lambda_*^{enr}$), respectively. Operations for generating the adapted UBM-GMM ($\lambda_*^{ubm}$) and the adapted ENR-GMM ($\lambda_*^{enr}$) are explained later regarding embodiments illustrated in FIG. 3.

The speaker verification module 130 generates (block 220 of FIG. 2, block 408 of FIG. 4) an enrolled speaker probability $P(X|\lambda^{enr})$ based on a combination of the sequence of feature vectors and the adapted ENR-GMM ($\lambda_*^{enr}$). The speaker verification module 130 also generates (block 220 of FIG. 2, block 408 of FIG. 4) a universal speaker probability $P(X|\lambda^{ubm})$ based on a combination of the sequence of feature vectors and the UBM-GMM ($\lambda_*^{ubm}$).

The enrolled speaker probability $P(X|\lambda^{enr})$ may be generated as log $(p(x|\lambda_*^{enr}))$, which may be generated based on modeling superposition of K Gaussian densities components $\Phi_{k1}$ with weights $u^*_{k1}$ trained based on feature vectors characterizing spectral distribution of voice of the candidate speaker speaking during a training, e.g., enrollment, phase. The enrolled speaker probability may be generated based on the following equation:

$$\log(p(x|\lambda_*^{enr})) = \sum_{n=1}^{N} \log\left(\sum_{k1=1}^{K} u^*_{k1}\Phi_{k1}(x_n)\right) \quad (6)$$

where summation over n accumulates contributions from individual features vectors $x_n$ in the sequence x. The components $\Phi_k$ are determined by set of means $\mu_{k1}$ and covariances $\Sigma_{k1}$ based on the following equation:

$$\Phi_{k1}(x_n) = \frac{\exp\left\{-\frac{1}{2}(x_n - \mu_{k1})^T \sum_{k1}^{-1} (x_n - \mu_{k1})\right\}}{(2\pi)^{\frac{D}{2}}|\Sigma_{k1}|^{\frac{1}{2}}} \quad (7)$$

The universal speaker probability $P(X|\lambda_*^{ubm})$ may be generated as $\log(p(x|\lambda_*^{ubm}))$, which may be generated based on modeling superposition of K Gaussian densities components $\Phi_{k2}$ with weights $u^*_{k2}$ trained based a combination of feature vectors characterizing spectral distributions of voices of a plurality, or all, of the candidate speakers of a set speaking during a training, e.g., enrollment, phase. The universal speaker probability may be generated based on the following equation:

$$\log(p(x|\lambda_*^{ubm})) = \sum_{n=1}^{N} \log\left(\sum_{k2=1}^{K} u^*_{k2}\Phi_{k2}(x_n)\right) \quad (8)$$

where summation over n accumulates contributions from individual features vectors $x_n$ in the sequence x. The components $\Phi_{k2}$ are determined by set of means $\mu_{k2}$ and covariances $\Sigma_{k2}$ $$\Phi_{k2}(x_n) = \frac{\exp\left\{-\frac{1}{2}(x_n - \mu_{k2})^T \sum_{k2}^{-1} (x_n - \mu_{k2})\right\}}{(2\pi)^{\frac{D}{2}}|\Sigma_{k2}|^{\frac{1}{2}}} \quad (9)$$

The speaker verification module 130 generates (block 230 of FIG. 2, block 410 of FIG. 4) a speaker verification indication of whether the speaker is an enrolled speaker based on a comparison of the enrolled speaker probability $P(X|\lambda_*^{enr})$ to the universal speaker probability $P(X|\lambda_*^{ubm})$. The speaker verification indication may be generated by calculating a difference between the log-likelihoods of x, given the models $\lambda_*^{enr}$ and $\lambda_*^{ubm}$ to construct $$\Lambda(x) = \log(p(x|\lambda_*^{enr})) - \log(p(x|\lambda_*^{ubm})) \quad (10)$$

The log-likelihood distance $\Lambda$ measures how much better the transcript adapted enrolled speaker model ($\lambda_*^{enr}$) scores for the sampled speech compared to the transcript adapted universal background model ($\lambda_*^{ubm}$). Then the hypothesis test can be resolved as:

if $\Lambda(x) > \theta$ accept $H_0$, if $\Lambda(x) \leq \theta$ accept $H_1$ \quad (11)

where $H_0$ refers to the speaker being determined to be the enrolled speaker, and $H_1$ refers to the speaker not being determined to be the enrolled speaker.

An indication of the enrolled speaker is selectively communicated (block 412 of FIG. 4) based on whether the speaker verification indication satisfies a defined rule. The defined rule can control the speaker verification module 130 to respond to determining that $\Lambda(x) > \theta$ by adding an identifier for the enrolled speaker to speaker identification metadata that has logical associations to defined locations in the closed-caption text string corresponding to where the identified speaker is speaking and/or by adding an identifier for the enrolled speaker to speaker identification metadata that has logical associations to defined locations in the audio content corresponding to where the identified speaker is speaking. The audio and video content 160 including the speaker identification metadata and possibly further including the closed-caption text strings, can be broadcast, streamed, and/or otherwise provided to the client computer devices 150a, 150b, etc. through the data network 170. The client computers 150a, 150b, etc. may display the speaker identifier as a subtitle, e.g., in real-time, while displaying video content through a corresponding display screen of the client computers 150a, 150b, etc. The speaker identifier may be displayed on the display screen synchronized in time with when the speaker's voice is present in the audio content being played through a speaker of the client computers 150a, 150b, etc.

Figure 5:
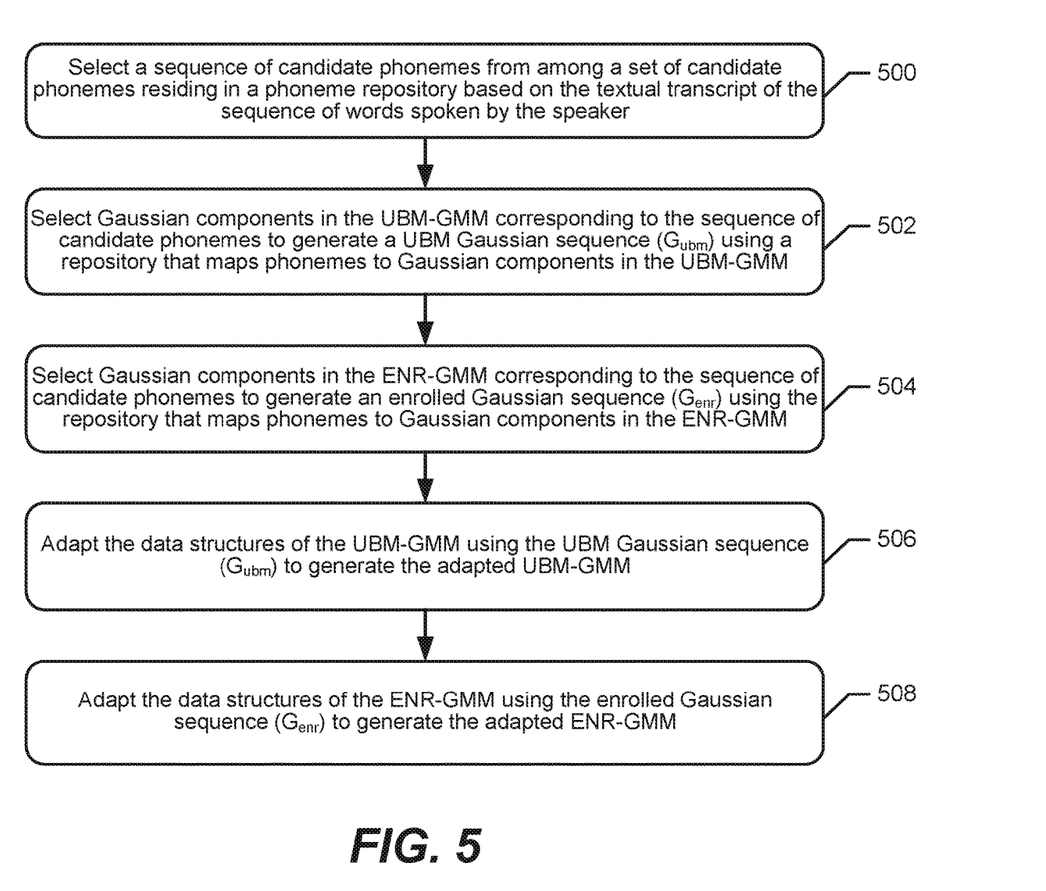

FIG. 3 is a block diagram of further components of the ENR-GMM and UBM-GMM adaptation module 210 of FIG. 2 that generates the adapted ENR-GMM ($\lambda_*^{enr}$) and the adapted UBM-GMM ($\lambda_*^{ubm}$) based on the textual transcript of the tested speech according to some embodiments of the present disclosure. FIG. 5 is a flowchart of associated operations that can be performed by the speaker verification module 130 to adapt (block 210 of FIG. 2, block 406 of FIG. 4) data structures of the UBM-GMM ($\lambda^{ubm}$) and of the ENR-GMM ($\lambda^{enr}$) responsive to the textual transcript, to generate the adapted UBM-GMM ($\lambda_*^{ubm}$) and the adapted ENR-GMM ($\lambda_*^{enr}$), respectively, comprises.

Referring to FIGS. 3 and 5, the speaker verification module 130 selects (block 300, block 500) a sequence (P) of candidate phonemes from among a set of candidate phonemes residing in a phoneme repository 122 based on the textual transcript of the sequence of words spoken by the speaker. The speaker verification module 130 selects (block 320, block 502) Gaussian components in the UBM-GMM ($\lambda^{ubm}$) corresponding to the sequence of candidate phonemes to generate a UBM Gaussian sequence (Gubm) using a repository 124 that maps phonemes to Gaussian components in the UBM-GMM ($\lambda^{ubm}$). The speaker verification module 130 selects (block 320, block 504) Gaussian components in the ENR-GMM ($\lambda^{enr}$) corresponding to the sequence of candidate phonemes to generate an enrolled Gaussian sequence (Genr) using the repository 124 that maps phonemes to Gaussian components in the ENR-GMM ($\lambda^{enr}$). The speaker verification module 130 then adapts (block 340, block 506) the data structures of the UBM-GMM ($\lambda^{ubm}$) using the UBM Gaussian sequence (Gubm) to generate the adapted UBM-GMM ($\lambda_*^{ubm}$). The speaker verification module 130 also adapts (block 340, block 508) the data structures of the ENR-GMM ($\lambda^{enr}$) using the enrolled Gaussian sequence (Genr) to generate the adapted ENR-GMM ($\lambda_*^{enr}$). A probabilistic language model 350, which for a given transcript T identifies the probabilities of occurrence of the candidate phonemes in the phoneme sequence (P) given the transcription (T) for a defined language, may be used during adaptation of the data structures of the UBM-GMM ($\lambda^{ubm}$) to generate the adapted UBM-GMM ($\lambda_*^{ubm}$) and during adaptation of the data structures of the ENR-GMM ($\lambda^{enr}$) to generate the adapted ENR-GMM ($\lambda_*^{enr}$).

Although FIGS. 4 and 5 illustrate various operations being performed in a defined serial order, some of the separate operations may be performed in parallel or in another order. The operational dependencies between the different operations can be seen in FIGS. 2 and 3. For example, the operations of blocks 400-402 may be performed in parallel with or after the operations of blocks 404-406, while the operations of block 408 must be performed before the operation of block 410. The operations of blocks 502 and 506 may be performed in parallel with or after the operations of blocks 504 and 508.

Referring again to FIG. 1, in some applications it is desired to generate a speaker verification indication for each speaker in a set of enrolled speakers, so that the speaker verification indication can be compared to identify which of the enrolled speaker most likely corresponds to the speaker from whom the sampled speech was obtained. Referring to FIG. 6, for each enrolled speaker in a set of enrolled speakers, the speaker verification module 130 repeats (block 600) the adapting (block 210 of FIG. 2, 406 of FIG. 4) data structures of a UBM-GMM and of an ENR-GMM, the generating (block 220, block 408) an enrolled speaker probability and a universal speaker probability, and the generating (block 230, block 410) a speaker verification. The operation of selectively communicating (block 412) an indication of the enrolled speaker based on whether the speaker verification indication satisfies a defined rule, then includes identifying (block 602) which one of the enrolled speakers in the set corresponds to one of the speaker verification indications which best satisfies the defined rule, and communicating (block 604) an identifier for the one of the enrolled speakers that is identified (block 602).

Figure 7:
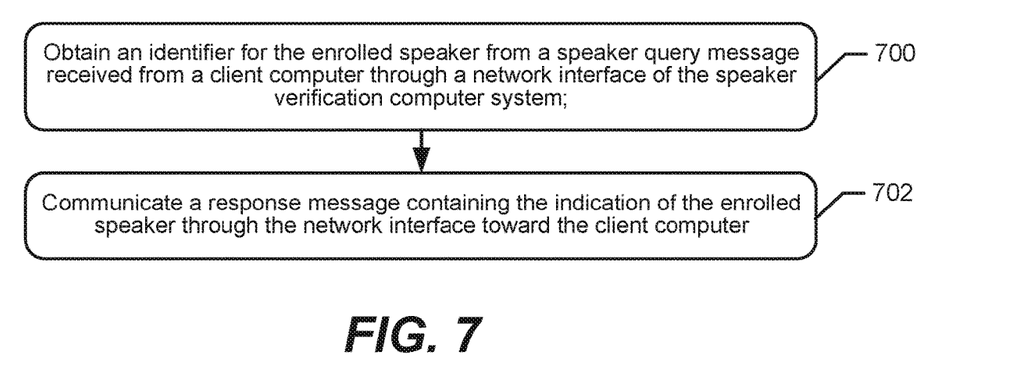

With continuing reference to FIG. 1 and reference to FIG. 7, an identifier for the enrolled speaker can be obtained (block 700) from a speaker query message (152 of FIG. 1) received from a client computer 150b through a network interface of the speaker verification computer system 102. The speaker verification module 130 then selectively communicates (block 412 of FIG. 4) an indication of the enrolled speaker based on whether the speaker verification indication satisfies a defined rule, by communicating (block 702) a response message (154 of FIG. 1) containing the indication of the enrolled speaker through the network interface toward the client computer 150b.

Figure 8:
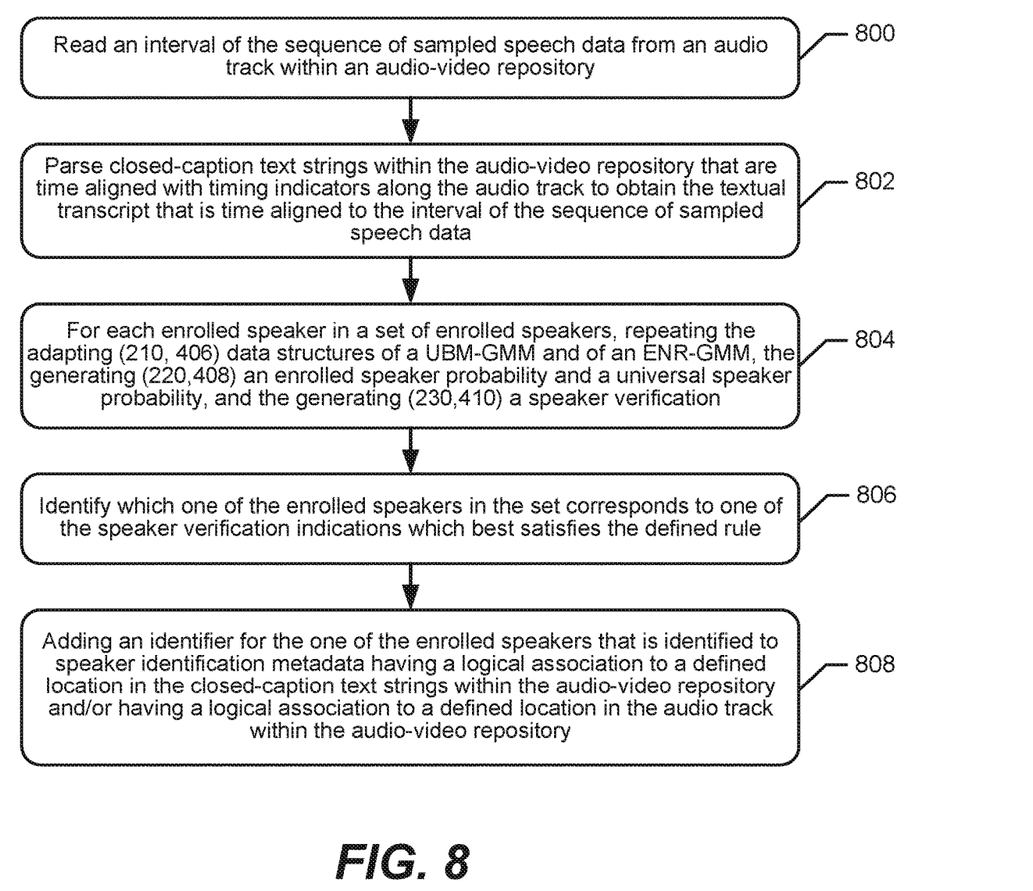

With continuing reference to FIG. 1 and reference to FIG. 8, a transcript (T) can be obtained from closed-caption text strings within the audio-video repository 110. The speaker verification module 130 can obtaining (block 400 of FIG. 4) a sequence of sampled speech data containing a sequence of words spoken by the speaker, by reading (block 800) an interval of the sequence of sampled speech data from an audio track within an audio-video repository 110. A textual transcript of the sequence of words spoken by the speaker can be obtained (block 404) by parsing (block 802) closed-caption text strings within the audio-video repository 110 that are time aligned with timing indicators along the audio track to obtain the textual transcript that is time aligned to the interval of the sequence of sampled speech data.

For each enrolled speaker in a set of enrolled speakers, the speaker verification module 130 can repeat (block 804) the adapting (block 210 of FIG. 2, block 406 of FIG. 4) data structures of the UBM-GMM and of the ENR-GMM, the generating (block 220, block 408) an enrolled speaker probability and a universal speaker probability, and the generating (block 230, block 410) a speaker verification. Selectively communicating (block 412) of an indication of the enrolled speaker by the speaker verification module 130 based on whether the speaker verification indication satisfies a defined rule, can include identifying (block 806) which one of the enrolled speakers in the set corresponds to one of the speaker verification indications which best satisfies the defined rule, and adding (block 808) an identifier for the one of the enrolled speakers that is identified to speaker identification metadata having a logical association to a defined location in the closed-caption text strings within the audio-video repository 110 and/or having a logical association to a defined location in the audio track within the audio-video repository 110.

Various embodiments of the present disclosure can therefore be performed by adaptation of equations (1)-(5) explained above. These embodiments can be based on steps that include:
1) Extracting audio transcript corresponding to the test utterance;
2) From the audio transcript, creating a space of likely phonemes using pronunciation dictionaries;
3) Selecting a set of Gaussian components of the speaker GMM and UBM models that correspond to the obtained phonemes;
4) Using selected components to create context adapted speaker and UBM models $\lambda^{enr} \rightarrow \lambda_*^{enr}$ and $\lambda^{ubm} \rightarrow \lambda_*^{ubm}$ (with significantly less components); and
5) Using $\lambda_*^{enr}$ and $\lambda_*^{ubm}$ to calculate equation (2), thus performing content normalization/adaptation of the speaker verification system.

For step 3), the GMM and UBM models can be pre-stored look-up tables that link each phoneme from a pronunciation dictionary to one or several data structures in the GMM and UBM models. Such look-up tables are calculated offline by clustering parametric representation of each phoneme into the UBM space and similar for the GMM speaker model. When verification scores are calculated in previous equation (2) the new speaker and UBM models $\lambda_*^{enr}$ and $\lambda_*^{ubm}$ are adapted to the content in the obtained speech segment, which makes the score influenced mainly by differences in the voice characteristics, thus improving the performance of the system. In practice the log-likelihood calculation, defined in equation (4), is modified from $\log(p(x|\lambda))$ to $\log(p(x|\lambda_*))$, i.e., the GMM $\lambda$: $\{u_k, \mu_k, \Sigma_k\}_{k \in \Pi}$ is replaced by $\lambda_*$: $\{u^*_k, \mu_k, \Sigma_k\}_{k \in \Pi^*}$, where $\Pi^*$ is the subset of GMM components in $\Pi = \{1, 2, \ldots, K\}$ as selected by the phone sequence in the currently obtained speech segment by means of the lookup tables.

Thus, the selected $\Pi^*$ components are related to the content of the speech segments, which influences the feature sequence x. The weights $u^*_k$ are a re-normalized version of $u_k$ that sum to one in the limited component set.

In situations where an audio transcript is not available, a textual transcript, from which text metadata can be parsed, can be generated using computer speech recognition operations. In one embodiment, the speaker verification module 130 uses a phoneme recognition algorithm to directly find the space of likely phonemes from step 2) of the above operations. Thus, in one embodiment, at least one processor of the speaker verification module 130 performs a voice recognition algorithm on a time interval of speech data that includes the speech segment data, to output a recognized word. The recognized word is parsed into a set of spoken phonemes.

Example Speaker Verification Computer System

Figure 9:
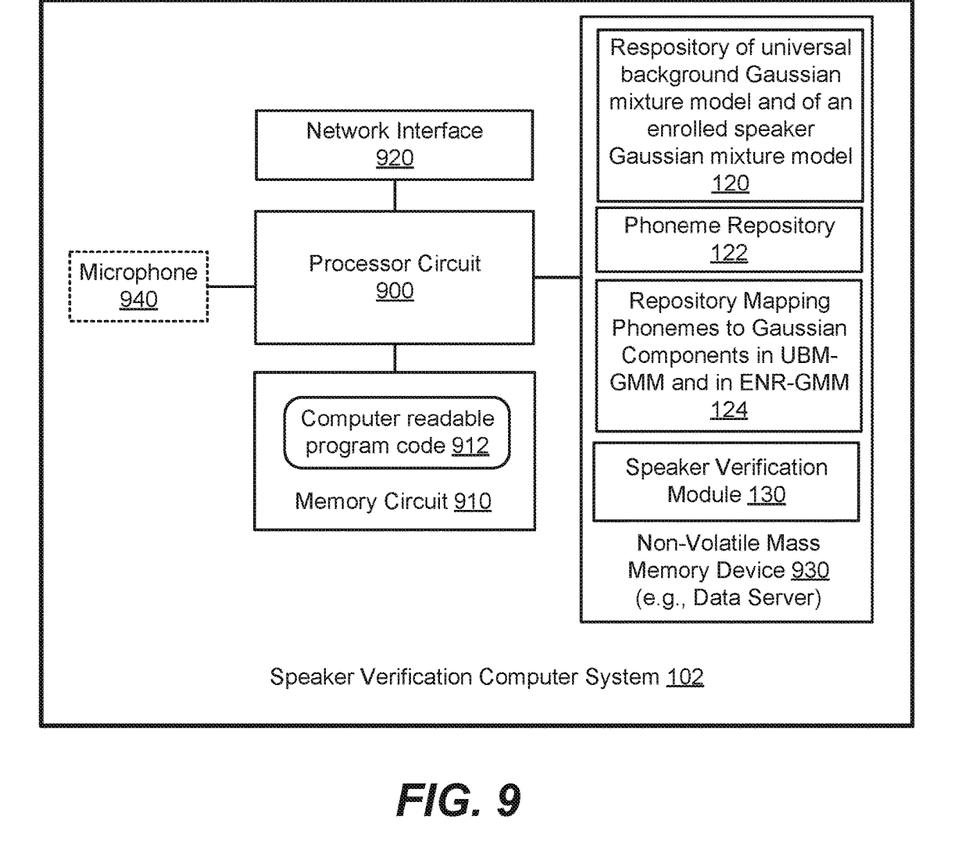
FIG. 9 is the speaker verification computer system of FIG. 1 configured according to some embodiments.

FIG. 9 is a block diagram of a speaker verification computer system 102 that is configured to perform operations according to one or more embodiments disclosed herein. The speaker verification computer system 102 includes at least one processor circuit 900, at least one memory circuit 910 containing computer readable program code 912, and a network interface 920. The speaker verification computer system 102 may further include or be communicatively connected to at least one non-volatile mass memory device 930, e.g., a networked data server computer, storing a repository 120 containing the UBM-GMM and containing the ENR-GMM. The non-volatile mass memory device 930 may contain a phoneme repository 122, a repository 124 of information mapping phonemes to Gaussian components in the UBM-GMM and in the ENR-GMM, and a speaker verification module 130.

The network interface 920 is configured to communicate with the audio-video repository 110 and client computers 150a, 150b, etc. The processor circuit 900 may include one or more data processing circuits, such as a general purpose and/or special purpose processor, e.g., microprocessor and/or digital signal processor. The processor circuit 900 is configured to execute the computer readable program code 912 in the memory circuit 910 to perform at least some of the operations described herein as being performed by a speaker verification computer system. The system 102 may include a microphone 940 that senses a speaker's voice and provides an analog or digital microphone signal to a component that provides the sampled speech data sequence (S) to the module 200 in FIG. 2.

| Abbreviations | Explanation |
| --- | --- |
| ENR | Enrolled speaker for which a GMM has been generated |
| GMM | Gaussian Mixture Model |
| UBM | Universal Background Model |
| K | Number of Mixture Components |
| Π | Set of Mixture Indexes |
| N | Number of Vectors in a Feature Sequence |

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method by a speaker verification computer system for verifying a speaker, the method comprising:
performing by at least one processor of the speaker verification computer system:
obtaining a sequence of sampled speech data containing a sequence of words spoken by the speaker;
generating a sequence of feature vectors characterizing spectral distribution of the sequence of sampled speech data;
obtaining a textual transcript of the sequence of words spoken by the speaker;
adapting data structures of a universal background model of a Gaussian mixture model, UBM-GMM, and of an Enrolled speaker Gaussian mixture model, ENR-GMM, responsive to the textual transcript, to generate an adapted UBM-GMM and an adapted ENR-GMM, respectively;
generating an enrolled speaker probability based on a combination of the sequence of feature vectors and the adapted ENR-GMM, and a universal speaker probability based on a combination of the sequence of feature vectors and the adapted UBM-GMM;
generating a speaker verification indication of whether the speaker is an enrolled speaker based on a comparison of the enrolled speaker probability to the universal speaker probability; and
selectively communicating an indication of the enrolled speaker based on whether the speaker verification indication satisfies a defined rule.

2. The method of claim 1, wherein the adapting data structures of a UBM-GMM and of an ENR-GMM responsive to the textual transcript, to generate an adapted UBM-GMM and an adapted ENR-GMM, respectively, comprises:
selecting a sequence of candidate phonemes from among a set of candidate phonemes residing in a phoneme repository based on the textual transcript of the sequence of words spoken by the speaker;
selecting Gaussian components in the UBM-GMM corresponding to the sequence of candidate phonemes to generate a UBM Gaussian sequence ($G_{ubm}$) using a repository that maps phonemes to Gaussian components in the UBM-GMM;
selecting Gaussian components in the ENR-GMM corresponding to the sequence of candidate phonemes to generate an enrolled Gaussian sequence ($G_{enr}$) using the repository that maps phonemes to Gaussian components in the ENR-GMM;
adapting the data structures of the UBM-GMM using the UBM Gaussian sequence ($G_{ubm}$) to generate the adapted UBM-GMM; and
adapting the data structures of the ENR-GMM using the enrolled Gaussian sequence ($G_{enr}$) to generate the adapted ENR-GMM.

3. The method of claim 1, further comprising:
for each enrolled speaker in a set of enrolled speakers, repeating the adapting data structures of a UBM-GMM and of an ENR-GMM, the generating an enrolled speaker probability and a universal speaker probability, and the generating a speaker verification;
wherein the selectively communicating an indication of the enrolled speaker based on whether the speaker verification indication satisfies a defined rule, comprises:
identifying which one of the enrolled speakers in the set corresponds to one of the speaker verification indications which best satisfies the defined rule; and
communicating an identifier for the one of the enrolled speakers that is identified.

4. The method of claim 1, further comprising:
obtaining an identifier for the enrolled speaker from a speaker query message received from a client computer through a network interface of the speaker verification computer system; and
the selectively communicating an indication of the enrolled speaker based on whether the speaker verification indication satisfies a defined rule,
comprises communicating a response message containing the indication of the enrolled speaker through the network interface toward the client computer.

5. The method of claim 1, wherein:
obtaining a sequence of sampled speech data containing a sequence of words spoken by the speaker,
comprises reading an interval of the sequence of sampled speech data from an audio track within an audio-video repository; and
obtaining a textual transcript of the sequence of words spoken by the speaker,
comprises parsing closed-caption text strings within the audio-video repository that are time aligned with timing indicators along the audio track to obtain the textual transcript that is time aligned to the interval of the sequence of sampled speech data.

6. The method of claim 5, further comprising:
for each enrolled speaker in a set of enrolled speakers, repeating the adapting data structures of a UBM-GMM and of an ENR-GMM, the generating an enrolled speaker probability and a universal speaker probability, and the generating a speaker verification;
wherein the selectively communicating an indication of the enrolled speaker based on whether the speaker verification indication satisfies a defined rule, comprises:
identifying which one of the enrolled speakers in the set corresponds to one of the speaker verification indications which best satisfies the defined rule; and
adding an identifier for the one of the enrolled speakers that is identified to speaker identification metadata having a logical association to a defined location in the closed-caption text strings within the audio-video repository and/or having a logical association to a defined location in the audio track within the audio-video repository.

7. The method of claim 1, wherein the generating an enrolled speaker probability based on a combination of the sequence of feature vectors and the adapted ENR-GMM, and a universal speaker probability based on a combination of the sequence of feature vectors and the adapted UBM-GMM, comprises:
generating the enrolled speaker probability based on modeling superposition of the sequence of feature vectors to K Gaussian densities components $\Phi_{k1}$ of the ENR-GMM multiplied by weights $u^*_{k1}$.

8. The method of claim 7, wherein the enrolled speaker probability is generated as log ($p(x|\lambda_*^{enr})$) determined based on the following equation:

$$\log(p(x|\lambda_*^{enr})) = \Sigma_{n=1}^{N} \log(\Sigma_{k1=1}^{K} u^*_{k1} \Phi_{k1}(x_n)),$$

where $\lambda_*^{enr}$ is the adapted ENR-GMM, $x=[x_1, x_2, \ldots, x_N]$ is a N by D dimensional matrix containing the sequence of feature vectors, the summation over n accumulates contributions from individual features vectors $x_n$ contained in the sequence x, and the components $\Phi_{k1}$ are determined by set of means $\mu_{k1}$ and covariances $\Sigma_{k1}$ of the adapted ENR-GMM based on the following equation:

$$\Phi_{k1}(x_n) = \frac{\exp\left\{-\frac{1}{2}(x_n - \mu_{k1})^T \sum_{k1}^{-1} (x_n - \mu_{k1})\right\}}{(2\pi)^{\frac{D}{2}} |\Sigma_{k1}|^{\frac{1}{2}}}.$$

9. The method of claim 7, wherein the generating an enrolled speaker probability based on a combination of the sequence of feature vectors and the adapted ENR-GMM, and a universal speaker probability based on a combination of the sequence of feature vectors and the adapted UBM-GMM, comprises:
generating the universal speaker probability based on modeling superposition of the sequence of feature vectors to K Gaussian densities components $\Phi_{k2}$ of the UBM-GMM multiplied by weights $u^*_{k2}$.

10. The method of claim 9, wherein the universal speaker probability is generated as $\log(p(x|\lambda_*^{ubm}))$ determined based on the following equation:

$$\log(p(x|\lambda_*^{ubm})) = \Sigma_{n=1}^{N} \log(\Sigma_{k2=1}^{K} u^*_{k2} \Phi_{k2}(x_n)),$$

where $\lambda_*^{ubm}$ is the adapted UBM-GMM, and the components $\Phi_{k2}$ are determined by set of means $\mu_{k2}$ and covariances $\Sigma_{k2}$ of the adapted UBM-GMM based on the following equation:

$$\Phi_{k2}(x_n) = \frac{\exp\left\{-\frac{1}{2}(x_n - \mu_{k2})^T \sum_{k2}^{-1} (x_n - \mu_{k2})\right\}}{(2\pi)^{\frac{D}{2}} |\Sigma_{k2}|^{\frac{1}{2}}}.$$

11. A speaker verification computer system for verifying a speaker and comprising:
at least one processor; and
at least one memory coupled to the at least one processor and comprising computer readable program code embodied in the at least one memory that when executed by the at least one processor causes the at least one processor to perform operations comprising:
obtaining a sequence of sampled speech data containing a sequence of words spoken by the speaker;
generating a sequence of feature vectors characterizing spectral distribution of the sequence of sampled speech data;
obtaining a textual transcript of the sequence of words spoken by the speaker;
adapting data structures of a universal background model of a Gaussian mixture model, UBM-GMM, and of an Enrolled speaker Gaussian mixture model, ENR-GMM, responsive to the textual transcript, to generate an adapted UBM-GMM and an adapted ENR-GMM, respectively;
generating an enrolled speaker probability based on a combination of the sequence of feature vectors and the adapted ENR-GMM, and a universal speaker probability based on a combination of the sequence of feature vectors and the adapted UBM-GMM;
generating a speaker verification indication of whether the speaker is an enrolled speaker based on a comparison of the enrolled speaker probability to the universal speaker probability; and
selectively communicating an indication of the enrolled speaker based on whether the speaker verification indication satisfies a defined rule.

12. The speaker verification computer system of claim 11, wherein the adapting data structures of a UBM-GMM and of an ENR-GMM responsive to the textual transcript, to generate an adapted UBM-GMM and an adapted ENR-GMM, respectively, comprises:
selecting a sequence of candidate phonemes from among a set of candidate phonemes residing in a phoneme repository based on the textual transcript of the sequence of words spoken by the speaker;
selecting Gaussian components in the UBM-GMM corresponding to the sequence of candidate phonemes to generate a UBM Gaussian sequence ($G_{ubm}$) using a repository that maps phonemes to Gaussian components in the UBM-GMM;
selecting Gaussian components in the ENR-GMM corresponding to the sequence of candidate phonemes to generate an enrolled Gaussian sequence ($G_{enr}$) using the repository that maps phonemes to Gaussian components in the ENR-GMM;
adapting the data structures of the UBM-GMM using the UBM Gaussian sequence ($G_{ubm}$) to generate the adapted UBM-GMM; and adapting the data structures of the ENR-GMM using the enrolled Gaussian sequence ($G_{enr}$) to generate the adapted ENR-GMM.

13. The speaker verification computer system of claim 11, the operations further comprising:

for each enrolled speaker in a set of enrolled speakers, repeating the adapting data structures of a UBM-GMM and of an ENR-GMM, the generating an enrolled speaker probability and a universal speaker probability, and the generating a speaker verification;

wherein the selectively communicating an indication of the enrolled speaker based on whether the speaker verification indication satisfies a defined rule, comprises:

identifying which one of the enrolled speakers in the set corresponds to one of the speaker verification indications which best satisfies the defined rule; and communicating an identifier for the one of the enrolled speakers that is identified.

14. The speaker verification computer system of claim 11, the operations further comprising:

obtaining an identifier for the enrolled speaker from a speaker query message received from a client computer through a network interface of the speaker verification computer system; and the selectively communicating an indication of the enrolled speaker based on whether the speaker verification indication satisfies a defined rule, comprises communicating a response message containing the indication of the enrolled speaker through the network interface toward the client computer.

15. The speaker verification computer system of claim 11, wherein:

obtaining a sequence of sampled speech data containing a sequence of words spoken by the speaker, comprises reading an interval of the sequence of sampled speech data from an audio track within an audio-video repository; and obtaining a textual transcript of the sequence of words spoken by the speaker, comprises parsing closed-caption text strings within the audio-video repository that are time aligned with timing indicators along the audio track to obtain the textual transcript that is time aligned to the interval of the sequence of sampled speech data.

16. The speaker verification computer system of claim 15, the operations further comprising:

for each enrolled speaker in a set of enrolled speakers, repeating the adapting data structures of a UBM-GMM and of an ENR-GMM, the generating an enrolled speaker probability and a universal speaker probability, and the generating a speaker verification;

wherein the selectively communicating an indication of the enrolled speaker based on whether the speaker verification indication satisfies a defined rule, comprises:

identifying which one of the enrolled speakers in the set corresponds to one of the speaker verification indications which best satisfies the defined rule; and adding an identifier for the one of the enrolled speakers that is identified to speaker identification metadata having a logical association to a defined location in the closed-caption text strings within the audio-video repository and/or having a logical association to a defined location in the audio track within the audio-video repository.

17. The speaker verification computer system of claim 11, wherein the generating an enrolled speaker probability based on a combination of the sequence of feature vectors and the adapted ENR-GMM, and a universal speaker probability based on a combination of the sequence of feature vectors and the adapted UBM-GMM, comprises:

generating the enrolled speaker probability based on modeling superposition of the sequence of feature vectors to K Gaussian densities components $\Phi_{k2}$ of the ENR-GMM multiplied by weights $u^*_{k1}$.

18. The speaker verification computer system of claim 17, wherein the enrolled speaker probability is generated as log $(p(x|\lambda_*^{enr}))$ determined based on the following equation:

$$\log(p(x|\lambda_*^{enr})) = \Sigma_{n=1}^N \log(\Sigma_{k1=1}^K u^*_{k1} \Phi_{k1}(x_n)),$$

where $\lambda_*^{enr}$ is the adapted ENR-GMM, $x=[x_1, x_2, \ldots, x_n]$ is a N by D dimensional matrix containing the sequence of feature vectors, the summation over n accumulates contributions from individual features vectors $x_n$ contained in the sequence x, and the components $\Phi_{k1}$ are determined by set of means $\mu_{k1}$ and covariances $\Sigma_{k1}$ of the adapted ENR-GMM based on the following equation:

$$\Phi_{k1}(x_n) = \frac{\exp\left\{-\frac{1}{2}(x_n - \mu_{k1})^T \sum_{k1}^{-1} (x_n - \mu_{k1})\right\}}{(2\pi)^{\frac{D}{2}} |\Sigma_{k1}|^{\frac{1}{2}}}.$$

19. The speaker verification computer system of claim 17, wherein the generating an enrolled speaker probability based on a combination of the sequence of feature vectors and the adapted ENR-GMM, and a universal speaker probability based on a combination of the sequence of feature vectors and the adapted UBM-GMM, comprises:

generating the universal speaker probability based on modeling superposition of the sequence of feature vectors to K Gaussian densities components $\Phi_{k2}$ of the UBM-GMM multiplied by weights $u^*_{k2}$.

20. A computer program product, comprising a non-transitory computer readable medium storing a computer program executable by a processor of a computer system to perform operations comprising:

obtaining a sequence of sampled speech data containing a sequence of words spoken by the speaker;

generating a sequence of feature vectors characterizing spectral distribution of the sequence of sampled speech data;

obtaining a textual transcript of the sequence of words spoken by the speaker;

adapting data structures of a universal background model of a Gaussian mixture model, UBM-GMM, and of an Enrolled speaker Gaussian mixture model, ENR-GMM, responsive to the textual transcript, to generate an adapted UBM-GMM and an adapted ENR-GMM, respectively;

generating an enrolled speaker probability based on a combination of the sequence of feature vectors and the adapted ENR-GMM, and a universal speaker probability based on a combination of the sequence of feature vectors and the adapted UBM-GMM;

generating a speaker verification indication of whether the speaker is an enrolled speaker based on a comparison of the enrolled speaker probability to the universal speaker probability; and selectively communicating an indication of the enrolled speaker based on whether the speaker verification indication satisfies a defined rule.

* * * * *